US008493757B2

(12) United States Patent
Carletti et al.

(10) Patent No.: US 8,493,757 B2
(45) Date of Patent: Jul. 23, 2013

(54) AC/DC CONVERTER WITH A PFC AND A DC/DC CONVERTER

(75) Inventors: Andrea Carletti, Munich (DE); Albino Pidutti, Martignacco (IT)

(73) Assignee: Infineon Technologies AG, Neubiberg (DE)

( * ) Notice: Subject to any disclaimer, the term of this patent is extended or adjusted under 35 U.S.C. 154(b) by 241 days.

(21) Appl. No.: 13/117,572

(22) Filed: May 27, 2011

(65) Prior Publication Data
US 2012/0300515 A1 Nov. 29, 2012

(51) Int. Cl.
*H02M 1/00* (2007.01)

(52) U.S. Cl.
USPC .................................. 363/78; 363/79; 363/80

(58) Field of Classification Search
USPC .................. 363/74, 78, 79, 80, 126, 127, 131
See application file for complete search history.

(56) References Cited

U.S. PATENT DOCUMENTS

| 6,882,551 | B2 * | 4/2005 | Shimada et al. ................ 363/79 |
| 7,088,081 | B2 * | 8/2006 | Takahashi et al. ............. 323/222 |
| 7,453,248 | B2 * | 11/2008 | Takeuchi ...................... 323/285 |
| 8,184,456 | B1 * | 5/2012 | Jain et al. ..................... 363/21.02 |
| 2012/0201061 | A1 * | 8/2012 | Hampo et al. .................. 363/74 |

OTHER PUBLICATIONS

"Power Factor," Wikipedia Encyclopedia (www.wikipedia.org), Retrieved from: http://en.wikipedia.org/wiki/Power_factor#Power_factor_correction_in_non-linear_loads, Last modified: Mar. 22, 2011, 8 pages.
"Buck Converter," Wikipedia Encyclopedia (www.wikipedia.org), Retrieved from: http://en.wikipedia.org/wiki/Buck_converter, Last modified: Mar. 25, 2011, 12 pages.
"DC-to-DC Converter," Wikipedia Encyclopedia (www.wikipedia.org), Retrieved from: http://en.wikipedia.org/wiki/DC-to-DC_converter, Last modified: Mar. 26, 2011, 5 pages.

* cited by examiner

*Primary Examiner* — Adolf Berhane
*Assistant Examiner* — Lakaisha Jackson
(74) *Attorney, Agent, or Firm* — Slater & Matsil, L.L.P.

(57) ABSTRACT

Disclosed is a power converter including a power factor corrector and a DC/DC converter and a power conversion method.

18 Claims, 3 Drawing Sheets

AC/DC CONVERTER WITH A PFC AND A DC/DC CONVERTER

TECHNICAL FIELD

The present invention relates to a power converter circuit, in particular to a power converter circuit with a power factor corrector (PFC) and a DC/DC converter coupled to the PFC.

BACKGROUND

Many electronic devices, such as computers, TV sets, or batteries that have to be charged, require a DC voltage as an input voltage, while the supply voltage that is available from the power grid is an AC voltage. In these cases an AC/DC conversion, that converts the AC input voltage into a DC output voltage, is required. In particular in those cases, in which the power consumption of the load is higher than several 10 W, additionally to the power conversion a power factor correction is required. The power factor correction serves to minimize the reactive power and to maximize the real power taken from the grid.

An AC/DC converter that provides power factor correction includes a power factor corrector (PFC) and a DC/DC converter coupled to the PFC. The PFC is usually a boost converter that generates a DC voltage that is higher than the amplitude (peak value) of the AC input voltage. The DC/DC converter converts the DC voltage provided by the PFC into a DC output voltage supplied to the load voltage. The input voltage and the input current of the PFC have a sine waveform. When the power factor of the PFC is close to 1, such as between 0.97 and 1, the input voltage and the input current are almost in phase, so that the input power of the PFC has a sine squared ($sin^2$) waveform that cause ripples of the PFC output voltage. In order to reduce the amplitude of those ripples a capacitor, that is also referred to as DC link capacitor, is connected between output terminals of the PFC.

The DC link capacitor may have a capacitance of up to several mF (milli-Farads) and is usually implemented as an electrolytic capacitor. However, electrolytic capacitors have a relatively short lifetime, have high leakage currents, and are expensive.

There is, therefore, a need to provide an AC/DC power converter circuit with a PFC and a DC/DC converter in which the size of the DC link capacitor can be reduced without degrading the power conversion efficiency and without increasing ripples of a DC voltage at the output of the DC/DC converter.

SUMMARY OF THE INVENTION

A first aspect relates to a power conversion circuit, including a power factor corrector with input terminals for receiving an AC input voltage, and output terminals for providing a first output voltage, and a DC/DC converter with input terminals coupled to the output terminals of the power factor corrector, and output terminals for providing a second output voltage. The DC/DC converter further includes a control circuit configured to control an input current of the DC/DC converter dependent on a reference signal, the reference signal having a frequency that is dependent on a frequency of the AC input voltage.

A second aspect relates to an AC/DC power conversion method. The method includes generating a power factor controlled first output voltage from an AC input voltage, and generating a second output voltage from the first output voltage. Generating the second output voltage includes generating a clocked voltage from the first output voltage, the clocked voltage having a frequency and a duty cycle, and rectifying the clocked voltage using an inductive rectifier arrangement. The duty cycle of the clocked voltage is dependent on a reference signal, wherein the reference signal has a frequency that is dependent on a frequency of the AC input voltage.

BRIEF DESCRIPTION OF THE DRAWINGS

Embodiments of the present invention will now be explained with reference to the drawings. It should be noted that these embodiments serve to illustrate the basic principles, so that only those features necessary for understanding the basic principles are illustrated. The drawings are not to scale. Further, like reference characters denote like features throughout the drawings.

DETAILED DESCRIPTION OF ILLUSTRATIVE EMBODIMENTS

Figure 1:
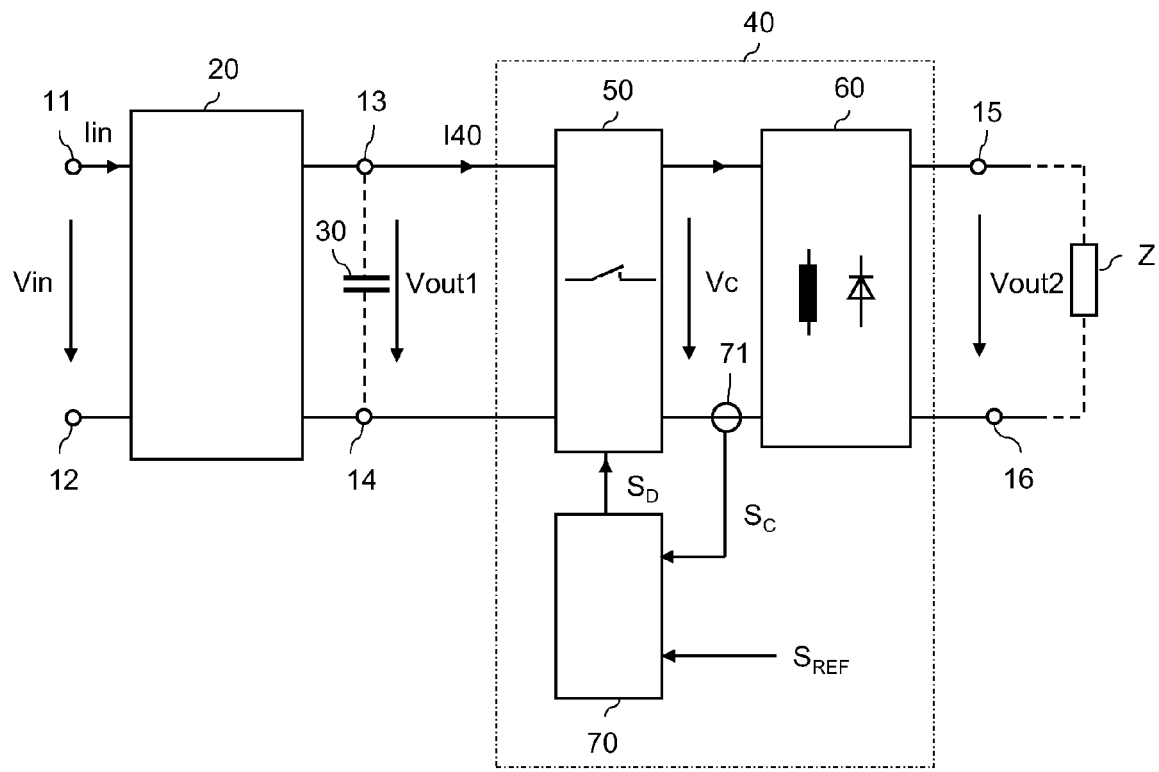
FIG. 1 schematically illustrates an embodiment of an AC/DC converter including a power factor corrector (PFC) and a DC/DC converter coupled to the PFC.

FIG. 1 schematically illustrates an embodiment on an AC/DC converter. The converter includes a power factor corrector (PFC) 20 having input terminals 11, 12 for receiving an AC input voltage Vin and output terminals 13, 14 for providing a first output voltage Vout1. A DC/DC converter 40 is coupled to the PFC 20 such that the DC/DC converter 40 receives the first output voltage Vout1 as an input voltage. Input terminals of the DC/DC converter 40 correspond to the output terminals 13, 14 of the PFC. The DC/DC converter 40 is configured to generate a second output voltage Vout2 from the first output voltage Vout1 of the PFC 20. The second output voltage Vout2 is a DC voltage and is available at output terminals 15, 16 of the DC/DC converter 40. The second output voltage Vout2 may be used to supply a load Z (illustrated in dashed lines in FIG. 1).

A capacitive element 30, such as a capacitor, is connected between the output terminals 13, 14 of the PFC 20. However, by virtue of a specific operating principle of the DC/DC converter 40 a capacitance of this capacitive element 30 can be relatively small as compared to conventional AC/DC converters. According to one embodiment, the capacitance of the output capacitor 30 of the PFC 20 is only approximately between 0.001 ($10^{-3}$) times and 0.01 ($10^{-2}$) times the capacitance of the output capacitor of a conventional AC/DC converter.

Figure 2:
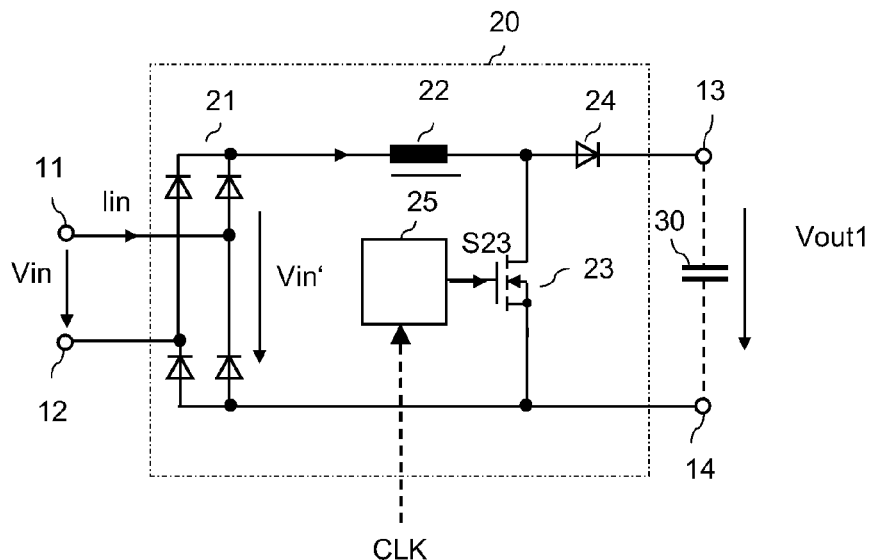
FIG. 2 illustrates an embodiment of the PFC.

The PFC 20 can be implemented like a conventional PFC. Just for illustration purposes, an embodiment of the PFC 20 is illustrated in greater detail in FIG. 2. Referring to FIG. 2, the PFC 20 may include a rectifier arrangement 21, such as a bridge rectifier, connected to the input terminals 11, 12. The rectifier arrangement 21 receives the input voltage Vin and is configured to generate a rectified input voltage Vin' from the input voltage Vin. When, for example, the input voltage Vin has a sine waveform, the rectified input voltage Vin' has a waveform corresponding to the absolute value of a sine wave. The PFC 20 further has a boost converter stage that receives the rectified input voltage Vin' and generates the first output voltage Vout1. The boost converter stage includes a series circuit with an inductive element 22, such as a choke, and an electronic switch 23. This series circuit is coupled to the rectifier arrangement 21 such that the rectified input voltage Vin' is available across the series circuit. The electronic switch 23 is, for example, a transistor, in particular a MOSFET, as illustrated in FIG. 2. However, the use of a MOSFET, specifically of an n-MOSFET, as the electronic switch 23 is only an example. Any other switching component, such as a p-MOSFET, an IGBT (insulated gate bipolar transistor), a BJT (bipolar junction transistor), a JFET (junction field-effect transistor) or a GTO (Gate Turn-Off Thyristor) may be used as well. The same applies to other electronic switches that will be explained herein below.

The PFC 20 further includes a rectifier element 24 connected between a circuit node that is common to the inductive element 22 and the electronic switch 23 and one of the output terminals 13, 14. The rectifier element 24 can be implemented as a diode (as illustrated in FIG. 2). However, the rectifier element 24 could also be implemented as a synchronous rectifier (SR) with switching components.

The electronic switch 23 receives a pulse-width modulated (PWM) drive signal S23 from a PFC controller 25. The PFC controller 25 can be a conventional PFC controller that is configured to generate a PWM drive signal, such as PWM drive signal S23 of FIG. 2, such that a power factor is close to 1, such as between 0.97 and 1, and such that an output voltage, such as the first output voltage Vout1 in FIG. 2, is at least close to a desired voltage, such as, for example, 400V. The PWM drive signal S23 is, for example, generated with a frequency (fixed or variable) that is dependent on a clock signal CLK (illustrated in dashed lines in FIG. 2). This clock signal CLK may be an external clock signal generated by an external clock signal generator (not shown), or may be a clock signal generated in the PFC controller. Such conventional PFC controllers are commonly known so that no further explanations are required in this regard.

Again referring to FIG. 1, the DC/DC converter 40 includes a switching unit 50 coupled to the output terminals 13, 14 of the PFC 20, and an inductive rectifier 60 connected between the switching unit 50 and the output terminals 15, 16. The switching unit 50 includes at least one electronic switch, such as a transistor, and is configured to generate a clocked voltage (or square wave voltage) Vc from the first output voltage Vout1. The clocked voltage Vc is generated in accordance with a pulse-width modulated (PWM) drive signal $S_D$, so that a frequency and/or a duty cycle and/or a phase of the clocked voltage corresponds to a frequency and/or a duty cycle and/or a phase of the drive signal $S_D$, respectively. The drive signal $S_D$ is generated by a control circuit 70 in a manner that will be explained in further detail herein below.

The inductive rectifier 60 includes at least one inductive element, such as, e.g., a choke and/or a transformer or elements coupled without cables, and at least one rectifier element, such as, e.g., a bipolar diode, a Schottky diode, or a synchronous rectifier. The inductive rectifier 60 is configured to rectify the clocked voltage Vc in order to generate the second output voltage Vout2, which is a DC voltage.

The operating principle of the control circuit 70 generating the at least one drive signal $S_D$ will now be explained. For explanation purposes it will be assumed that the input voltage Vin has a sine waveform so that $$Vin = V_0 \cdot \sin(\omega t)$$

where $V_0$ is the amplitude, and where $w = 2\pi \cdot f$. The input voltage Vin is, in particular, a voltage provided by a power grid. Dependent on the country, the amplitude A0 is, for instance, 155V (110VRMS) or 325V (230VRMS). The frequency f is usually 50 Hz or 60 Hz.

An input current Iin resulting from this input voltage Vin is:

$$Iin = I_0 \cdot \sin(\omega t + \phi) \qquad (2),$$

where $I_0$ is an amplitude of the input current and $\phi$ is a phase shift between the input voltage Vin and the input current Iin. For explanation purposes it is further assumed that a power factor of the PFC 20 is close to 1, such as between 0.97 and 1. In this case, the phase-shift $\phi$ is approximately 0. An input power Pin of the PFC 20 is then given as:

$$Pin = Vin \cdot Iin = V_0 \cdot I_0 \cdot \sin^2(\omega t) = \tfrac{1}{2} \cdot V_0 \cdot I_0 \cdot (1 - \cos(2\omega t)) \qquad (3).$$

Referring to equation (3) the input power Pin varies between a maximum input power PinMAX, with PinMAX=$V_0 \cdot I_0$, and a minimum input power, which is zero, at a frequency $2\omega$ which is twice the frequency of the input voltage Vin.

In a conventional AC/DC converter the DC/DC converter coupled to the PFC has a constant input power, so that a relatively large output capacitor of the PFC is required in order to buffer variations of the input power of the PFC 20, so that ripples of the output voltage of the PFC 20 can be reduced.

In the AC/DC converter of FIG. 1, the power circuit 70 is configured to drive the switching arrangement 50 such that an instantaneous value of an input power of the DC/DC converter 40 equals, neglecting the losses, the instantaneous input power of the PFC 20. The input power $Pin_{40}$ of the DC/DC converter equals the output power $Pout_{20}$ of the PFC ($Pin_{40} = Pout_{20}$). Further, the output power $Pout_{20}$ of the PFC equals its input power Pin (Pin=$Pout_{20}$). The PFC 20 is configured to provide a DC output voltage Vout1. Thus, in order for the input power $Pin_{40}$ of the DC/DC converter to be equal to the output power $Pout_{20}$ of the PFC 20, an input current I40 of the DC/DC converter 40 should be as follows:

$$I40 = \frac{Pin_{40}}{Vout1} = \frac{Pout_{20}}{Vout1} = \frac{Pin}{Vout1} = \frac{V_0 \cdot I_0}{Vout1} \cdot \sin^2(\omega t) = \frac{1}{2} \cdot \frac{V_0}{Vout1} \cdot (1 - \cos(2\omega t)). \qquad (4)$$

Thus, the control circuit 70 is configured to drive the switching arrangement 50 such that the moving average of the input current I40 of the DC/DC converter 40 has a waveform that corresponds to the waveform of the input power Pin of the PFC 20. In general, the control circuit 70 is configured to drive the switching arrangement 50, by providing the at least one drive signal $S_D$, such that the drive signal $S_D$ is dependent on a reference signal $S_{REF}$, where the reference signal $S_{REF}$ has a frequency that is dependent on the frequency of the AC input voltage Vin. Thus, when the input voltage Vin is a sine wave voltage, the reference signal $S_{REF}$ is a sine squared signal. According to one embodiment, the reference signal $S_{REF}$ is derived from the input voltage Vin or the input current Iin of the PFC 20, so that the waveform of the reference signal $S_{REF}$ is in phase with the waveform of the input power Pin of the PFC.

In order to control the input current I40 of the DC/DC converter 40 the control circuit 70 receives an input current signal $S_C$ that is representative of the input current I40. The input current signal $S_C$ can be obtained by measuring the input current I40. In the embodiment illustrated in FIG. 1, a current measurement unit 71 that is coupled to the load path of the DC/DC converter 40 provides the current measurement signal $S_C$. However, measuring the input in order to obtain the input current signal $S_C$ is only an example. The input current I40 could also be estimated or derived from an other parameter, such as a voltage across individual elements of the inductive rectifier 60, a detailed example of which will be explained with reference to FIG. 3. According to one embodiment, the current measurement signal $S_C$ is proportional to the input current I40.

The switching arrangement 50 is switched on and off dependent on the PWM drive signal $S_D$, so that, according to one embodiment, the square wave voltage Vc has a duty cycle corresponding to the duty cycle $S_D$ of the drive signal. The input current I40 is not a continuous current, but is cyclically switched on and off dependent on the drive signal $S_D$. However, a switching frequency, which is a frequency of the drive signal $S_D$, is significantly higher than the frequency of the desired variations of the input current I40, so that a mean value of the input current I40 meets equation (4). While the frequency of the variations of the input power Pin of the PFC 20 and, therefore, the desired variations of the input current I40 of the DC/DC converter 40 is double of the frequency of the input voltage Vin, e.g., 100 Hz or 120 Hz, a frequency of the drive signal $S_D$ is much higher. According to one embodiment, the switching frequency is in the range of several kilohertz (kHz) and is, therefore, much faster than the desired variations of the input current I40.

By controlling the input current I40 of the DC/DC converter 40 such that the input current varies in accordance with variations of the input power Pin of the PFC 20 an energy buffer at the output of the PFC 20 is not required, or only a smaller energy buffer is required. Thus, the capacitor 30 at the output of PFC 20 could be omitted, or a capacitance of this output capacitor 30 can be significantly lower than the capacitance at the output of a conventional PFC.

Figure 3:
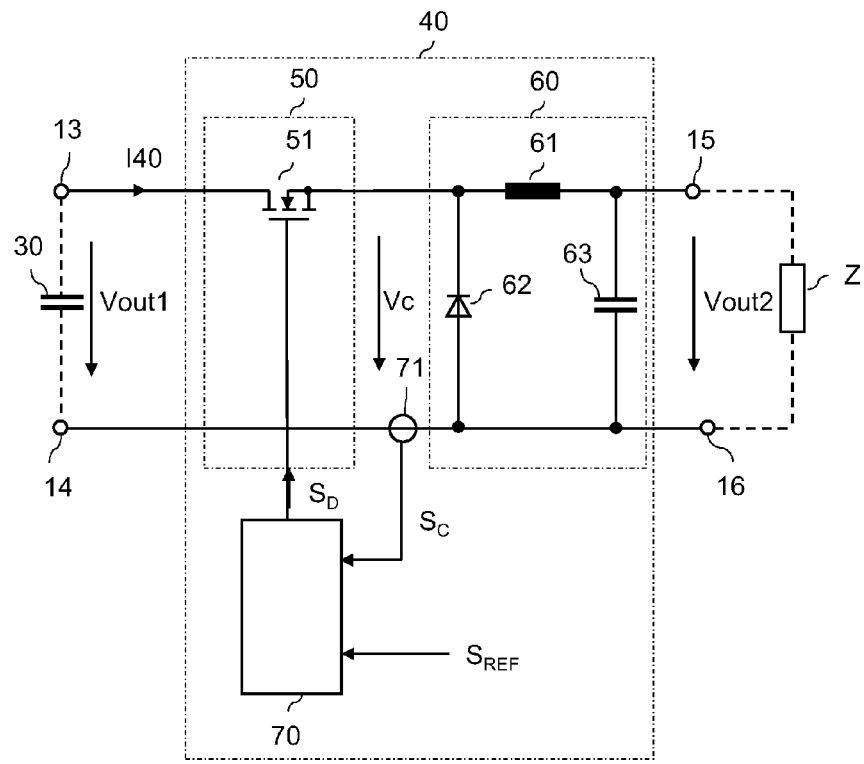
FIG. 3 illustrates an embodiment of a DC/DC converter having a buck converter topology.

The DC/DC converter 40 can be implemented with a conventional DC/DC converter topology. FIG. 3 illustrates a simplified embodiment in which the DC/DC converter 40 has a buck converter topology. In this embodiment the switching arrangement 50 includes one electronic switch 51. The electronic switch 51 has a load path that is connected to one of the input terminals 13, 14 and has a control terminal for receiving the drive signal $S_D$. In the embodiment according to FIG. 3, the electronic switch 51 is implemented as a MOSFET, specifically as an n-type MOSFET. However, this is only an example, any other type of electronic switch may be used as well. In the embodiment of FIG. 3, the electronic switch 51 is connected to a first input terminal 13 of the DC/DC converter 40.

The inductive rectifier 60 includes a series circuit with inductive element 61 such as, for example, a choke, and a capacitive element 63. This series circuit with the inductive element 61 and the capacitive element 63 is connected in series with the electronic switch 51 such that the inductive element 61 is connected between the electronic switch 51 and one of the output terminals 15, 16 and such that the capacitive element 63 is connected between the output terminals 15, 16, so that the output voltage Vout2 is available across the capacitive element 63. A second input terminal 14 and a second output terminal 16 are electrically coupled with each other, wherein in the embodiment of FIG. 3 only the current measurement unit 71 is connected between these terminals 14, 16. The inductive rectifier 60 further includes a rectifier element 62 connected in parallel with the series circuit including the inductive element 61 and the capacitive element 63.

The operating principle of the DC/DC converter 40 illustrated in FIG. 3 will now be explained. The electronic switch 51 is cyclically switched on and off by the PWM drive signal $S_D$. When the electronic switch 51 is in its on-state, the output voltage Vout1 of the PFC (20 in FIG. 1), which is the input voltage of the DC/DC converter 40 is applied to the inductive rectifier 60. Through this, the input current I40, which is the current through the inductive element 61, increases until the electronic switch 51 is switched off. When the electronic switch 51 is switched off, the rectifier element 62 acts as a freewheeling element that takes over the current through the inductive element 61, wherein the current through the inductive element 61 decreases during the off-state of the electronic switch 51.

The input current I40 of the DC/DC converter 40, in particular a mean value of the input current I40, can be regulated through the PWM drive signal $S_D$, by suitably adjusting a duty cycle of the drive signal $S_D$ dependent on the current measurement signal $S_C$ and the reference signal $S_{REF}$.

Figure 4:
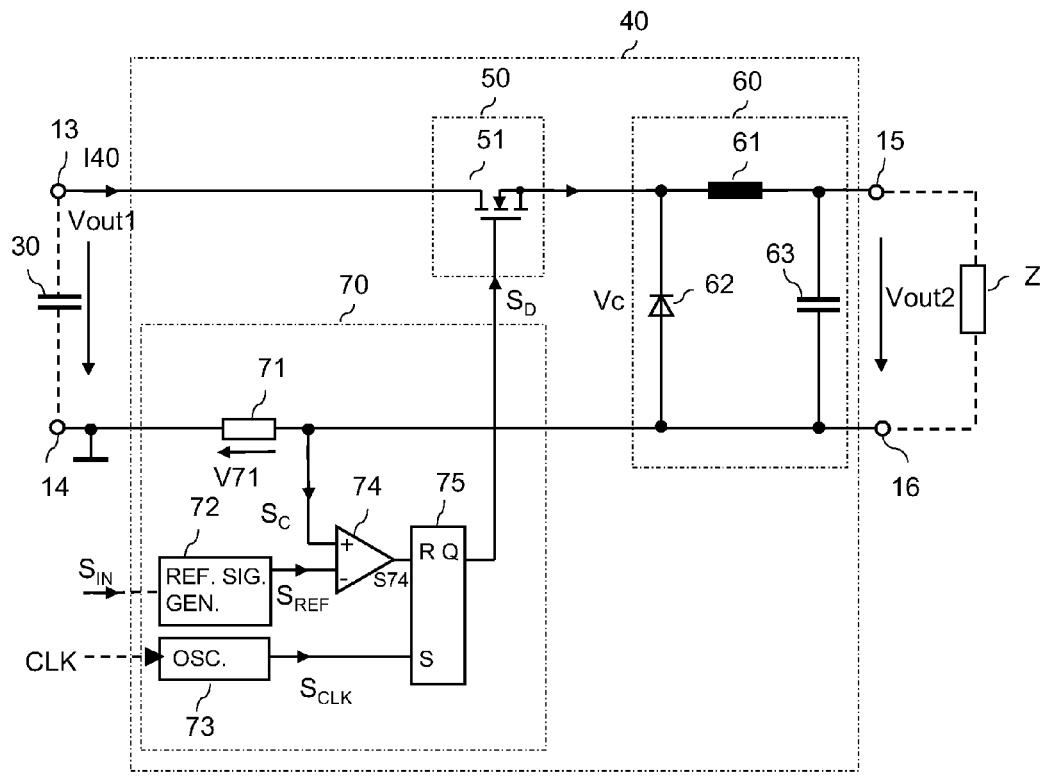
FIG. 4 illustrates the DC/DC converter of FIG. 3 wherein a control circuit of a switching element is illustrated in detail.

An embodiment of the control circuit 70 that is configured to generate the drive signal $S_D$ such that the input current I40 of the DC/DC converter 40 has the waveform of the reference signal $S_{REF}$ is illustrated in FIG. 4. The control circuit 70 includes an oscillator 73 providing a clock signal $S_{CLK}$. This clock signal $S_{CLK}$ defines a frequency of the PWM drive signal $S_D$. In the control circuit of FIG. 4, the clock signal $S_{CLK}$ is received at a set input S of an SR flip-flop 75. The drive signal $S_D$ is available at a non-inverting output Q of the flip-flop 75. Optionally, a driver (not illustrated) is connected between the output Q of the flip-flop 75 and the control terminal of the electronic switch 51. This driver amplifies the logic signal available at the output of the flip-flop 75 to a signal level that is suitable to drive the electronic switch 51. According to one embodiment, the clock signal $S_{CLK}$ provided by the oscillator 73 is synchronized with the clock signal CLK that governs generation of the PWM signal in the PFC. For this, the oscillator 73 may receive the clock signal CLK.

The control circuit 70 further includes a comparator 74 that receives the reference signal $S_{REF}$ at a first input and the current measurement signal $S_C$ at a second input. In the embodiment of FIG. 4, the first input is an inverting input of the comparator 74, and the second input is a non-inverting input of the comparator. The reference signal $S_{REF}$ is provided by a reference signal generator 72. According to one embodiment, the reference signal generator 72 generates the reference signal $S_{REF}$ dependent on an input signal S. The input signal $S_{IN}$ represents one of the input voltage Vin and the input current Iin of the PFC. According to one embodiment, the input signal $S_{IN}$ is proportional to one of the input voltage Vin and the input current Iin. According to one embodiment, the reference signal $S_{REF}$ is proportional to the square of the input signal Sin, so that:

$$S_{REF} \sim \text{Sin}^2 \qquad (5).$$

If, the input signal $S_{IN}$ is proportional to the input voltage Vin, then, referring to equation (1), the following applies:

$$S_{REF} \sim V_0^2 \cdot \sin^2(\omega t) \qquad (6).$$

In the embodiment of FIG. 4, the current measurement unit 71 is implemented as a shunt resistor 71. The current measurement signal $S_C$ is a voltage V71 across the shunt resistor 71. In this embodiment, the shunt resistor 71 is connected to the second input terminal 14 of the DC/DC converter 40. This second input terminal 14 is, for example, coupled to a reference potential, such as ground, which is also the reference potential of the control circuit 70. Thus, it is sufficient to couple one of the terminals of the shunt resistor 71 to the second input terminal of the comparator 74 in order to receive the voltage V71 at the second terminal of the comparator 74.

A comparator signal, that is available at an output of the comparator 74, is received at a reset input R of the flip-flop 75. While the clock signal SCLK defines the frequency of the drive signal $S_D$, the comparator signal S74 defines the duty cycle of the drive signal $S_D$, wherein the duty cycle is adjusted such that the waveform of the input current I40, which is represented by the current measurement signal $S_C$, follows the reference signal $S_{REF}$.

Figure 5:
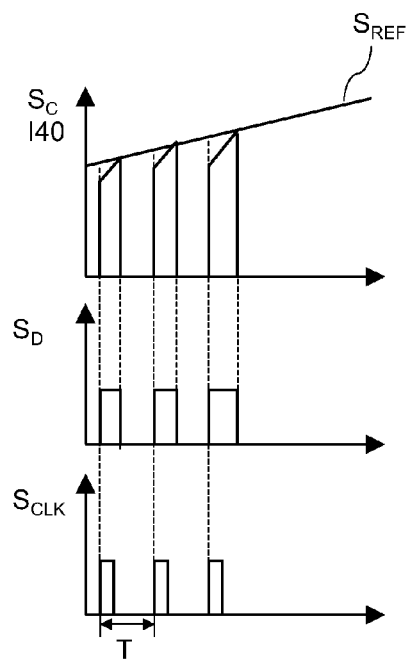
FIG. 5 shows timing diagrams illustrating the operating principle of the control circuit of FIG. 4.

The operating principle of the control circuit 70 of FIG. 4 will be explained with reference to FIG. 5 in which timing diagrams of the current measurement signal $S_C$, that represents the input current I40, the clock signal $S_{CLK}$ and the drive signal $S_D$ are illustrated. It should be noted that the DC/DC converter 40 can be operated in continuous current mode (CCM) or in discontinuous current mode (DCM). In CCM, the current through the inductive element 61 does not decrease to 0 when the electronic switch 51 is switched off, so that the input current I40 (as illustrated in FIG. 5) has a trapezoid waveform. In DCM the current through the inductive element 61 drops to 0 when the electronic switch 51 is in its off-state. In this case, the input current I40 has a triangular waveform (not shown).

In the control circuit 70 of FIG. 4, the drive signal $S_D$ assumes an on-level, that switches the electronic switch 51 on, each time a signal pulse of the clock signal SCLK occurs. A frequency fCLK of the clock signal $S_{CLK}$, therefore, defines the switching frequency of the drive signal $S_D$. A clock period of the clock signal $S_{CLK}$ is TCLK so that the clock frequency fCLK is 1/TCLK. In FIG. 5, an on-level of the drive signal $S_D$ is a high signal level or a logic "1" level. However, this is only an example. An on-level of the drive signal $S_D$ could also be a low level.

When the drive signal $S_D$ assumes an on-level, the electronic switch 51 is switched on, so that the input current I40 increases. The electronic switch 51 is switched off, when the input current signal $S_C$ reaches the reference signal $S_{REF}$. The frequency of the reference signal $S_{REF}$ is much smaller than the switching frequency of the drive signal $S_D$, and since only several drive periods of the drive signal $S_D$ are illustrated in FIG. 5, FIG. 5 only shows a small fraction of one period of the reference signal $S_{REF}$. The regulation provided by the control circuit 70 causes the duty cycle of the drive signal $S_D$ to increase when the reference signal $S_{REF}$ increases, and causes the duty cycle to decrease, when the reference signal $S_{REF}$ decreases, wherein a moving average of the input current I40 increases when the duty cycle increases, and the moving average of the input current I40 decreases, when the duty cycle decreases. The moving average is an average of the input current on one or more drive cycles or drive periods T, such as between 1 and 10 drive cycles. Thus, a waveform of a moving average of the input current I40 follows the waveform of the reference signal $S_{REF}$. The control circuit 70 therefore acts as a current controller that controls the input current I40 of the DC/DC converter such that a signal waveform of a moving average of the input current I40 corresponds to a waveform of the reference signal $S_{REF}$, wherein the waveform of the reference signal represents the waveform of the input power Pin of the PFC 20.

In the AC/DC converter described above, the instantaneous energy delivered by the PFC 20 is, except losses, the same as the instantaneous energy received by the DC/DC converter 40 during the switching periods.

In the AC/DC converter explained above, the output voltage of the power factor corrector 20 and the input current I40 of the DC/DC converter are controlled. However, there is no control of the output voltage Vout2 of the DC/DC converter. An AC/DC converter of that kind can, e.g., be used to supply an electric load Z that defines the output voltage Vout2 itself such as, e.g., an accumulator or a battery to be charged. The AC/DC converter may therefore be used as a battery charger.

Figure 6:
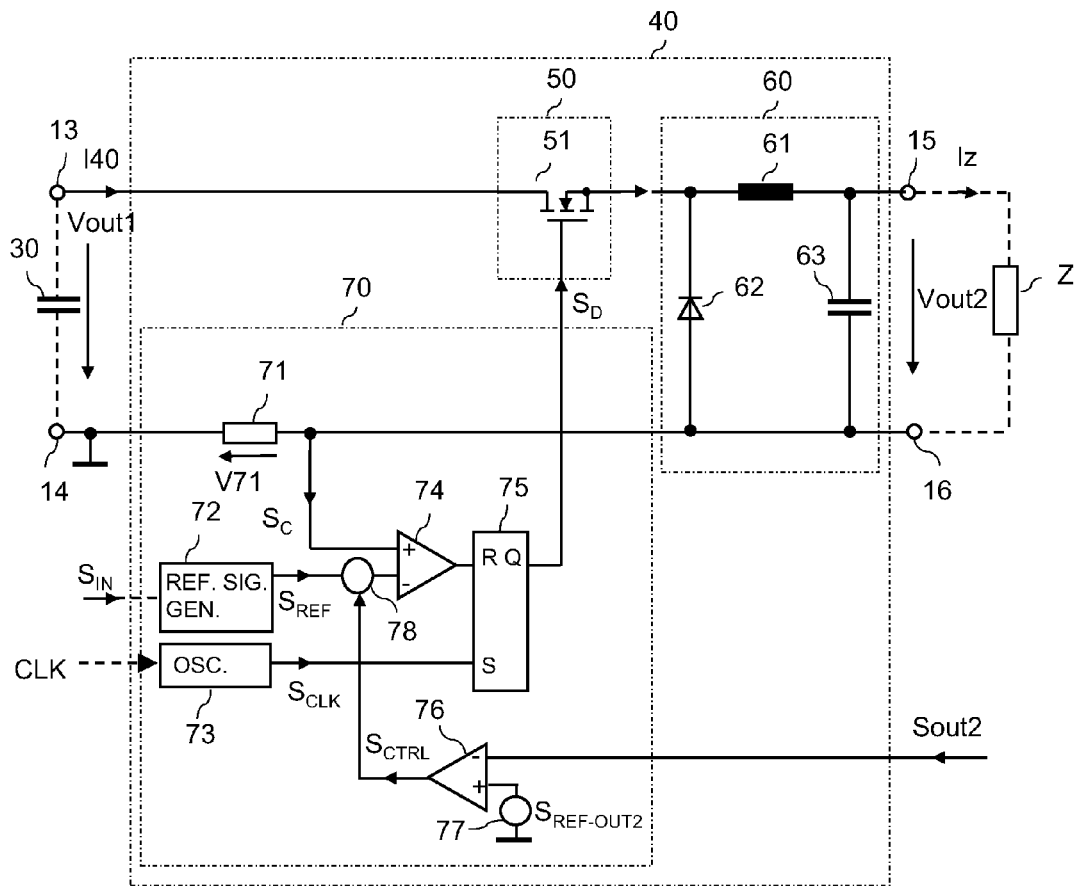
FIG. 6 illustrates a further embodiment of a DC/DC converter having a buck converter topology.

FIG. 6 illustrates an embodiment of a control circuit 70 that is not only capable of controlling the input current I40 dependent on the reference signal $S_{REF}$, but that is also capable of regulating the output voltage Vout2. However, instead of the output voltage Vout2, also the output current or the output power of the DC/DC converter 40 could be regulated. In this embodiment, the control circuit 70 includes a controller 76 that receives an output signal Sout2 and a further reference signal $S_{REF-OUT2}$. The output signal Sout2 is dependent on the output voltage Vout2. In particular, the output signal Sout2 is proportional to the output voltage Vout2. The output signal Sout2 can be generated from the output voltage Vout2 in a conventional manner using, for example, a voltage divider (not shown). The further reference signal $S_{REF-OUT2}$ is provided by a reference voltage source 77. The further reference signal $S_{REF-OUT2}$ represents the desired voltage value of the output voltage Vout2. The controller 76 provides a control signal $S_{CTRL}$ from a difference between the output signal Sout2 and the further reference signal $S_{REF-OUT2}$. The controller 76 is, for example, an integral controller (I controller) or a proportional plus integral controller (PI controller). A multiplier 78 receives the control signal $S_{CTRL}$ and the reference signal $S_{REF}$ and provides a signal that represents the product of these two signal $S_{CTRL}$, $S_{REF}$ to the first input terminal of the comparator 74. When, for example, the output voltage Vout2 falls below the desired voltage value, so that the output signal Sout2 falls below the further reference signal $S_{REF-OUT2}$, the control signal $S_{CTRL}$ increases, and a signal level of the signal at the first input of the comparator 74 generally increases. This results in an overall increase of the duty cycle of the drive signal $S_D$. This overall increase of the duty cycle of the drive signal $S_D$ causes the mean value of the input current I40 to increase, so as to counteract the decrease of the output voltage Vout2. It should be noted in this connection that the controller 76 is implemented such that variations of the control signal $S_{CTRL}$ have a frequency that is much lower than the switching frequency of the drive signal $S_D$. When the output voltage Vout2 raises above the desired voltage value, the output signal Sout2 raises, so that the control signal $S_{CTRL}$ decreases and the input signal at the first input of the comparator 74 generally decreases. Thus the duty cycle of the drive signal $S_D$ generally decreases and the mean value of the input current I40 decreases.

The control circuit 70 of FIG. 6 has two control loops: a first control loop that controls the input current I40 to have a waveform corresponding to the waveform of the reference signal $S_{REF}$; and a second control loop that, by amplifying the reference signal $S_{REF}$, is configured to generally increase or decrease the duty cycle of the drive signal $S_D$ in order to control the output voltage Vout2. Instead of the output voltage Vout2, an output current Iz or an output power could be regulated by generating the control signal $S_{CTRL}$ dependent on the output current Iz or the output power. The output power is the product of the output voltage Vout2 and the output current Iz.

It should be noted that using a DC/DC converter 40 having a buck converter topology is only an example. Any other DC/DC converter topology may be used as well.

What is claimed is:

1. A power converter, comprising:
   a power factor corrector comprising input terminals for receiving an AC input voltage, and output terminals for providing a first output voltage;
   a DC/DC converter comprising input terminals coupled to the output terminals of the power factor corrector, and output terminals for providing a second output voltage, the DC/DC converter further comprising:
   a control circuit configured to control an input current of the DC/DC converter dependent on a reference signal, the reference signal having a frequency that is dependent on a frequency of the AC input voltage.

2. The power converter of claim 1, wherein the DC/DC converter further comprises:
   a switching arrangement coupled to the input terminals of the DC/DC converter and having a control terminal for receiving at least one drive signal; and
   an inductive rectifier arrangement coupled between the switching arrangement and the output terminals of the DC/DC converter;
   wherein the control circuit is configured to provide the at least one drive signal for the switching arrangement dependent on the reference signal.

3. The power converter of claim 2, wherein the control circuit further comprises:
   an oscillator configured to provide a clock signal with a clock frequency;
   a current evaluation unit configured provide an input current signal that is dependent on the input current of the DC/DC converter;
   a comparator configured to compare the reference signal with the input current signal and to provide a comparator signal;
   a logic circuit configured to receive the clock signal and the comparator signal and configured to generate the at least one drive signal as a clocked signal with a frequency corresponding to the clock frequency and with a duty cycle that is dependent on the comparator signal.

4. The power converter of claim 1, wherein the control circuit is configured to control the input current of the DC/DC converter such that a moving average of the input current is dependent on the reference signal.

5. The power converter of claim 4, wherein the moving average of the input current is proportional to the reference signal.

6. The power converter of claim 1, wherein the reference signal has a sine squared waveform and wherein the frequency of the reference signal is two-times the frequency of the AC input voltage.

7. The power converter of claim 1, wherein the control circuit includes a reference signal generator coupled to the input terminals of the power factor corrector and configured to provide the reference signal.

8. The power converter of claim 1, wherein the control circuit further comprises a first control loop configured to control the input current dependent on the reference signal.

9. The power converter of claim 1, wherein the reference signal has a waveform that is proportional to a square of a waveform of the AC input voltage.

10. The power converter of claim 1, wherein the DC/DC converter is implemented as a buck converter.

11. An AC/DC power conversion method, comprising:
    generating a power factor controlled first output voltage from an AC input voltage;
    generating a second output voltage from the first output voltage, wherein generating the second output voltage comprises:
    generating a clocked voltage from the first output voltage, the clocked voltage having a frequency and a duty cycle, wherein the duty cycle is dependent on a reference signal, wherein the reference signal has a frequency that is dependent on a frequency of the AC input voltage; and
    rectifying the clocked voltage using an inductive rectifier arrangement.

12. The method of claim 11, wherein the reference signal has a waveform that is proportional to a square of a waveform of the AC input voltage.

13. The method of claim 11, wherein the reference signal has a sine squared waveform and wherein the frequency of the reference signal is two-times the frequency of the AC input voltage.

14. The method of claim 11, wherein the duty cycle of the clocked voltage is further dependent on the second output voltage and a further reference signal.

15. The method of claim 11, wherein the frequency of the clocked voltage is a fixed frequency.

16. The method of claim 15, wherein the fixed frequency is a frequency of a clock signal provided by an oscillator.

17. The method of claim 11, wherein the duty cycle of the clocked voltage is further dependent on an input current of the inductive rectifier arrangement.

18. The method of claim 11, wherein the inductive rectifier arrangement is connected with at least one switching element in a buck converter topology.

* * * * *